(12) United States Patent  (10) Patent No.: US 8,751,396 B2
Cormier  (45) Date of Patent: Jun. 10, 2014

(54) FINANCIAL INSTRUMENT HAVING LOAN PROCEEDS AND PRE-PAID CHARACTERISTICS

(75) Inventor: Philip Antony Cormier, Dallas, TX (US)

(73) Assignee: Galileo Processing, Inc., Salt Lake City, UT (US)

(*) Notice: Subject to any disclaimer, the term of this patent is extended or adjusted under 35 U.S.C. 154(b) by 36 days.

(21) Appl. No.: 13/247,911

(22) Filed: Sep. 28, 2011

(65) Prior Publication Data

US 2012/0078793 A1    Mar. 29, 2012

Related U.S. Application Data

(60) Provisional application No. 61/387,130, filed on Sep. 28, 2010.

(51) Int. Cl.
*G06Q 40/00* (2012.01)
(52) U.S. Cl.
USPC .............................................. 705/44; 705/35
(58) Field of Classification Search
USPC .............................................. 705/39, 40, 44
See application file for complete search history.

(56) References Cited

U.S. PATENT DOCUMENTS 7,653,598 B1 * 1/2010 Hamilton et al. ............... 705/40
2006/0206421 A1 * 9/2006 Knapp ............................. 705/39

* cited by examiner

*Primary Examiner* — Ojo Oyebisi
(74) *Attorney, Agent, or Firm* — Maschoff Brennan (57) ABSTRACT

Financial methods and systems for using a financial instrument are disclosed. A financial account includes both a loan balance portion and a pre-paid cash balance portion. The loan balance portion and the pre-paid cash balance portion are used in performing a purchase transaction. The purchase transaction is initiated by the account holder using the financial instrument. A prioritization scheme is selected that indicates an order of priority of the loan balance portion and the pre-paid cash balance portion of a financial account. A purchase amount is applied to the financial account according to the prioritization scheme. A transaction fee is not charged by the financial institution when any portion of the loan balance portion is applied to the purchase amount. And, a transaction fee is charged by the financial institution when no portion of the loan balance portion is applied to the purchase amount.

20 Claims, 7 Drawing Sheets

|  | Day 1 |
|---|---|
| Loan Proceeds Limit | $50.00 |
| Prepaid Account | $100.00 |
| Loan OTB | $50.00 |
| Prepaid OTB | $100.00 |
| Card Holder OTB | $150.00 |

*Fig. 2*

|  | Day 1 |
|---|---|
| Loan Proceeds Limit | $50.00 |
| Prepaid Account | $100.00 |
| Purchase Authorization | $10.00 |
| Loan OTB | $40.00 |
| Prepaid OTB | $100.00 |
| Card Holder OTB | $140.00 |
| Transaction Fee Charged? | No |

*Fig. 3*

|  | Day 2 |
|---|---|
| Loan Proceeds Limit | $40.00 |
| Prepaid Account | $100.00 |
| Purchase Authorization | $60.00 |
| Loan OTB | $00.00 |
| Prepaid OTB | $80.00 |
| Card Holder OTB | $80.00 |
| Transaction Fee Charged? | No |

*Fig. 4*

|  | Day 3 |
|---|---|
| Loan Proceeds Limit | $00.00 |
| Prepaid Account | $80.00 |
| Purchase Authorization | $40.00 |
| Loan OTB | $00.00 |
| Prepaid OTB | $40.00 |
| Card Holder OTB | $40.00 |
| Transaction Fee Charged? | Yes |

FINANCIAL INSTRUMENT HAVING LOAN PROCEEDS AND PRE-PAID CHARACTERISTICS

CROSS-REFERENCE TO RELATED APPLICATIONS

This application claims the benefit of U.S. Provisional Patent Application No. 61/387,130 filed Sep. 28, 2010.

BACKGROUND

1. The Field of the Invention

The present invention relates generally to financial instruments. More specifically, the present invention relates to methods and systems for a financial instrument having both loan balance and pre-paid characteristics.

2. The Relevant Technology

Pre-paid financial instruments such as debit cards provide an alternative payment method to cash when making purchases. When making a purchase, cash withdrawal, account to account transfer, or other transaction with a pre-paid instrument, such as a debit card, the debit card holder is typically required to have a cash balance in an account associated with the debit card that exceeds the purchase amount. A debit card is often referred to as a check card because funds used to make a purchase are typically withdrawn directly from the cardholder's bank account.

In some cases, a transaction fee is charged when the pre-paid financial instrument, such as a debit card, is used. This allows the issuer of the pre-paid financial instrument, or a third party that processes any transactions, to make a profit based on the usage of the pre-paid instrument.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

The present invention relates generally to financial instruments. A method performed in a financial system that includes a financial instrument is disclosed. The financial instrument is associated with a financial account that includes both a loan balance portion and a pre-paid cash balance portion. The account may also include other balances such as savings or credit, but are not limited to just those balances. The loan balance portion and the pre-paid cash balance portion are used in performing a purchase transaction. The purchase transaction is initiated by the account holder using the financial instrument.

The method includes receiving at a computing system selection of a prioritization scheme that indicates an order of priority of the loan balance portion and the pre-paid cash balance portion, or other balances, of the financial account that are to be used to fund the purchase transaction. A purchase transaction may draw exclusively from one balance or draw a portion of the transaction amount from more than one balance. The method further includes receiving at the computing system a purchase authorization for the purchase transaction initiated by the account holder using the financial instrument, the purchase authorization including an account identifier and a purchase amount. The method further includes applying at the computing system at least a portion of the purchase amount to the financial account according to the prioritization scheme. A transaction fee may or may not be charged by the financial institution when any portion of the loan balance portion is applied to the purchase amount. And, a transaction fee may or may not be charged by the financial institution when no portion of the loan balance portion is applied to the purchase amount. The loan balance portion (or balance) and the cash balance portion (or balance), or any other balance, may have its own unique fee schedule assigned, and they fee schedule is applied when and if balance is used from that balance to settle a transaction.

Financial systems are also disclosed. The financial system can include one or more processors. The financial system can include a first storage location for maintaining a loan balance portion associated with an account. The financial system can include a second storage location for maintaining a pre-paid cash balance portion associated with the account. The financial system can include an infinite number of storage locations for maintaining a balance associated with the account. The loan balance portion and the pre-paid cash balance portion are both tied to a financial instrument used in making purchases. The financial system can include a tangible computer readable medium which stores computer-executable instructions which when executed, the computer-executable instructions cause the one or more processors to perform a method. The method can include receiving a purchase authorization for a transaction initiated by an account owner, the purchase authorization including an account identifier and a purchase amount. The method can further include determining an available balance of a loan balance portion of an account identified by the account identifier. The method can further include determining if the available balance of the loan balance portion is sufficient to cover at least a portion of the purchase amount. The method can further include applying at least a portion of the purchase amount to the loan balance portion of the account when the available balance exists such that the loan balance portion is first used to cover the purchase amount. And, the method can further include applying any portion of the purchase price not applied to the loan balance portion to a pre-paid cash balance portion of the account, or any other balance. A transaction fee may or may not be charged by a financial institution when any portion of the loan balance portion is applied to the purchase amount. And, a transaction fee may or may not be charged by the financial institution when no portion of the loan balance portion is applied to the purchase amount. The loan balance portion and the cash balance portion, or any other balance, may have its own unique fee schedule assigned, and they fee schedule is applied when and if balance is used from that balance to settle a transaction Additional features of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

In the following detailed description of various embodiments of the invention, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

The embodiments of the invention allow multiple balances to be attached to an account, which may include loan, cash, savings, credit, etc. Each balance can be managed by a separate fee schedule. And the sequence in which funds are pulled from each account to settle purchase transactions are prioritized. And since each fee schedule associated with each balance is unique, and every program is unique, a fee may or may not be charged when a specific balance is drawn from.

In one example, a two-balance account can be used with a loan balance and a cash balance. The loan balance can be prioritized first, with the cash balance second. If any funds from the loan balance are used, the fee schedule associated with the loan balance would be used, which in this embodiment would not charge a fee. But, in other embodiments a fee is charged.

Embodiments of the present invention provide for methods and systems for one or more loan balances or purses and one or more debit or cash balances or purses, along with the purse prioritization mechanism to prioritize the movement of funds from each balance. Embodiments of the present invention also consist of a separate and configurable fee table and usage velocity table for each balance or purse. In one embodiment, when a purchase is made using a financial instrument linked to an account, funds are first drawn from an account that included balance from a loan until the loan balance is all used. Any additional funds required to make the purchase are then drawn from a separate account, such as a pre-paid cash balance. In such embodiments, a transaction fee may or may not be charged to a user of the financial instrument by a financial institution that issues the financial instrument since a portion of the loan balance is used to make the purchase.

In another embodiment, when a purchase is made using the financial instrument linked to the account, funds are not drawn from the loan balance. This may be because the loan balance have all previously been used or because the account holder or the financial institution desires to use the pre-paid cash balance to cover the purchase amount. Regardless, since the loan balance is not used to cover any portion of the purchase, the financial institution may or may not charge the account holder a transaction fee for the use of the financial instrument.

Figure 1A:
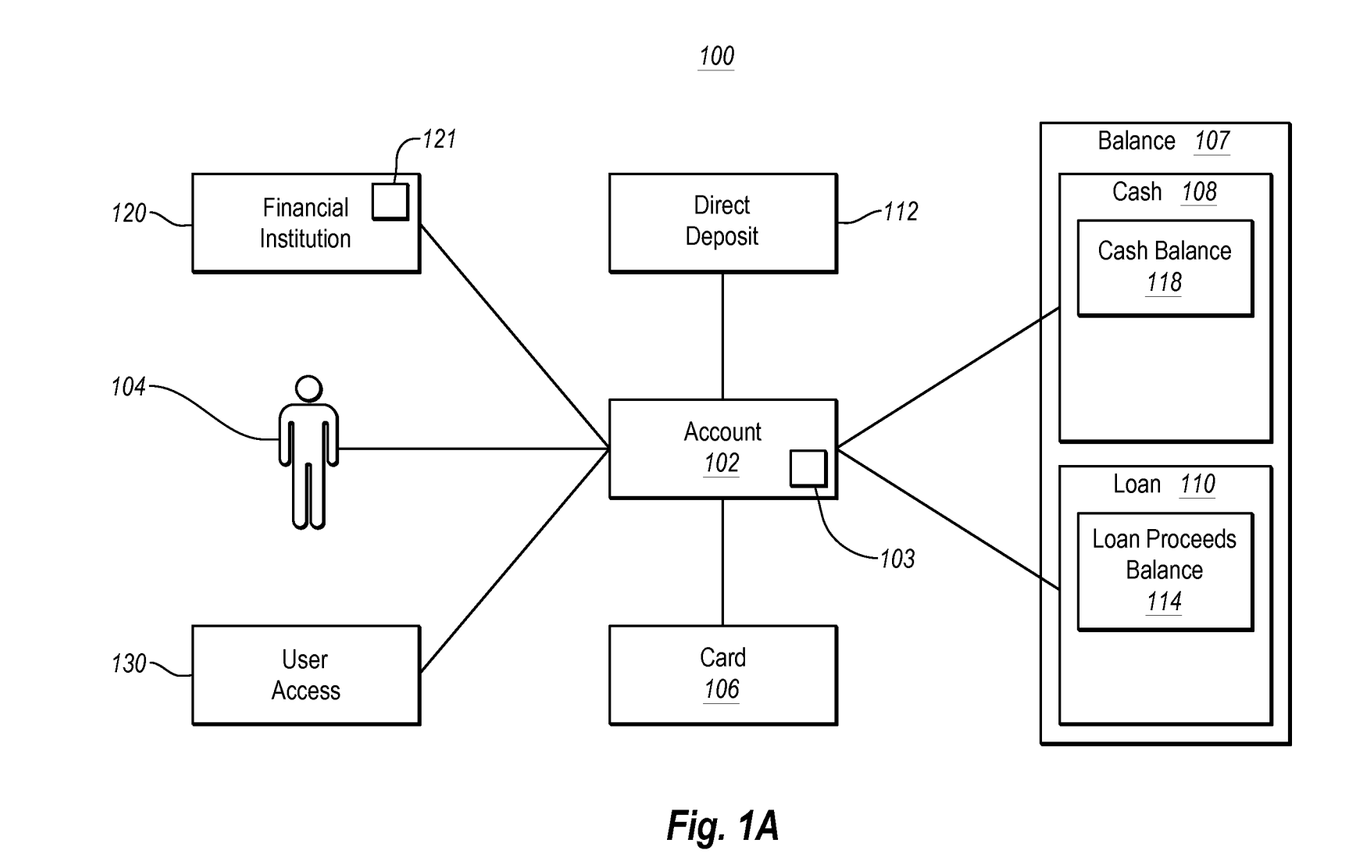
FIG. 1A illustrates a financial system in which the embodiments disclosed herein may be practiced.

Referring now to FIG. 1A, a more detailed example is illustrated using a diagrammed reference to the financial system 100, including a financial account 102. The financial account 102 may be linked to a financial instrument 106, such as a debit card. Although the present example includes the debit card 106 that may be used for accessing funds within the account 102, other mechanisms may also be employed for accessing the account funds, such as checks, online account access, and the like. Accordingly, although the financial instrument 106 is referred to hereinafter as "debit card 106" for ease of discussion, it should be noted that the financial instrument 106 may be another financial instrument such as, but not limited to, a check, a pre-paid debit card, a traditional debit card that is tied to a checking account, and a credit card that is tied to a credit account.

The account 102 may also be linked to a direct deposit mechanism 112 and account balances 107. In addition, the account 102 may include an account identifier 103 that links the account 102 to an account holder 104.

In accordance with the present invention, the account balances 107 may be divided into a cash balance portion 108 and a loan balance portion 110. The cash balance portion 108 may store a cash balance 118, and the loan proceed portion 110 may store a loan balance 114.

The account 102 may be further linked to a financial institution 120. In one embodiment, the financial institution 120 may be a short term lender such as a payday lender or a pawn shop that typically provide small loans to customers on a short term basis.

A payday loan (also called a paycheck advance) is a small, short-term loan that is intended to cover a borrower's expenses until his or her next payday. The loans are also sometimes referred to as cash advances, though that term can also refer to cash provided against a prearranged line of credit such as a credit card. Generally, a lender provides a short-term unsecured loan to be repaid at the borrower's next pay day. Typically, some verification of employment or income is involved (via pay stubs and bank statements), but some lenders may omit this. Borrowers can visit a payday lending store and secure a small cash loan, with payment due in full at the borrower's next paycheck. The borrower writes a postdated check to the lender in the full amount of the loan plus fees. On the maturity date, the borrower is expected to return to the store to repay the loan in person. If the borrower does not repay the loan in person, the lender may redeem the check. If the account is short on funds to cover the check, the borrower may now face a bounced check fee from their bank in addition to the costs of the loan, and the loan may incur additional fees and/or an increased interest rate as a result of the failure to pay. Consumers can also complete the loan application online (or in some instances via fax, especially where documentation is required). The loan is then transferred by direct deposit to the borrower's account, and the loan repayment and/or the finance charge is electronically withdrawn on the borrower's next payday.

A pawnbroker is an individual or business (pawnshop or pawn shop) that offers secured loans to people, with items of personal property used as collateral. If an item is pawned for a loan, within a certain contractual period of time the pawner may purchase it back for the amount of the loan plus some agreed-upon amount for interest. The amount of time, and rate of interest, is governed by law or by the pawnbroker's policies. If the loan is not paid (or extended, if applicable) within the time period, the pawned item will be offered for sale by the pawnbroker/secondhand dealer. Unlike other lenders, the pawnbroker does not report the defaulted loan on the customer's credit report, since the pawnbroker has physical possession of the item and may recoup the loan value through outright sale of the item. The pawnbroker/secondhand dealer also sells items that have been sold outright by customers to the pawnbroker or secondhand dealer.

However, the financial institution 120 may also be a traditional bank, credit union, savings and loan, or any other type of institution that provides loans to customers, whether it is a small, short term loan or a longer, more traditional loan. In another embodiment, the financial institution 120 may be a third party that processes transactions for another financial institution.

Typically, the account holder 104 will open the account 102 with the financial institution 120. In one embodiment, the account holder 104 will apply for and receive a short term loan 121, such as a payday loan, from the financial institution 120. The balance of the loan 121 may then be loaded as the loan balance 114 into the loan balance portion 110 of the account 102. If further short term loans are received from the financial institution 120 by the account holder 104 in addition to loan 121, these balances may also be loaded into the loan balance portion 110 and can be aggregated.

In addition, the account holder 104 may also load a cash amount into the cash balance portion 108 of account 102. The cash may be loaded into the cash balance portion 108 by any reasonable means, including, but not limited to, direct deposit from a paycheck or other source of income, directly paying the financial institution 120 the amount of cash to add to account 102, writing a check, wiring money to financial institution 120, or by providing access to another bank account. It will be appreciated that while the loan balance 114 will typically be limited to the amount of the loan 121 and any additional loans that are received from the financial institution 120, the cash balance 118 need not have any limit and may include as large a balance as the account holder 104 desires to add to the account 102, within limits that may or not be established by an issuing financial institution or other account manager.

In some embodiments, proceeds from a loan received from a financial institution other than financial institution 120 may also be loaded on the debit card 106 as cash using any of the methods discussed above and stored in the cash balance 118. Such an addition to the account 102 would not be considered loan balance 110 as the financial institution 120 managing the account 102 would have no way of knowing that the balance 118 added to the account 102 was received as loan balance from another financial institution.

In other embodiments, when the account holder 104 opens the account 102, the financial institution 120 managing the account 102 may require that the account holder 104 pay a minimum amount prior to opening the account 102. This is typically done to ensure the account holder 104 will have sufficient funds available so that the risk to the financial institution is lessened.

In another embodiment, the minimum amount required of each account holder 104 may differ depending on various factors, including credit scores, income levels, occupation, and the like. That is, the required amount may vary for each account holder 104 depending on the account holder's 104 financial situation and past credit use. Of course, it will be appreciated that no minimum amount may be required.

In another embodiment, the account holder 104 may not have a traditional bank account with another financial institution. In some cases, the financial institution 120 may determine that there is a higher level of risk when providing the loan 121 to such an account holder 104. To mitigate the risk, the financial institution 120 may require that the direct deposit mechanism 112 is configured for the direct deposit of a portion of a periodic paycheck into the account 102. In this way there is less risk to the financial institution 120 in providing the loan 121 as repayment of the loan 121 will automatically happen via the direct deposit mechanism 112.

As mentioned previously, the account 102, including the cash balance portion 108 and the loan balance portion 110 are tied to the debit card 106. This allows the account holder 104 to use the debit card 106 at any location that accepts debit cards, other debit cards such as those tied to a checking account, and credit cards such as those tied to a credit account. When making the purchase, the account holder 104 presents the debit card to a merchant, who then processes the debit card 106 to receive payment.

The financial institution 120 typically charges a transaction fee to the account holder 104 for use of the debit cards in order to make a profit off of processing the transaction. However, for debit cards 106 that are linked to an account 102 that includes loan balance, government regulations generally dissuade the financial institution 120 from charging the transaction fee when the loan balance 114 is spent using the debit card 106. Transaction fees may be charged, however, when the cash balance 118 is spent using the debit card 106

Accordingly, in one embodiment, the account 102 is configured such that when the account holder 104 attempts to make a purchase using the debit card 106, thereby generating a purchase authorization for a given amount, a determination is first made by the financial institution 120 as to whether the loan balance 114 stored in the loan balance portion 110 is sufficient to fund the requested amount for the purchase. If the purchase amount can be entirely funded by the loan balance 114, the purchase is funded in a similar manner as a traditional debit card, and the amount of the purchase is deducted from the loan balance 114 stored in the loan balance portion 110. That is, the amount of the purchase is paid directly by financial institution 120 to the merchant. Since the entire amount of the purchase was funded by the loan balance 114, no transaction fee is charged by the financial institution 120.

On the other hand, if the purchase amount exceeds the loan balance 114 (i.e., the purchase cannot be made without exceeding the loan balance 114), then the funds from the pre-paid cash balance portion 108 may be used to at least partially fund the transaction. For example, the loan balance portion 110 may be used to fund the purchase amount up until the loan balance 114 is reached (i.e., the entire amount of the loan balance 114 is used). Any remaining funds needed may then be drawn from the cash balance 118. As will be appreciated, the determination of which funds or combination of funds (funds in loan balance portion 110 and/or cash balance portion 108) is used fund the purchase transaction is performed at the financial institution 120 and is transparent to the merchant. That is, when the account holder 104 makes the purchase with the debit card 106, the merchant is paid the full purchase price directly by the financial institution 120 in a similar manner as a traditional debit card transaction.

In this situation, even though only a portion of the loan balance 114 was used to fund the transaction, no transaction fee is charged by the financial institution 120. This is to ensure that no government regulations are violated by charging a transaction fee when even a portion of the funds are from loan balance. Accordingly, even if the portion of the loan balance 114 used to fund the transaction is only a small percentage of the total transaction, even as little as $0.01, a transaction fee will not be charged.

Once the loan balance 114 has reached zero, any subsequent purchases or withdrawals from the account 102 using the debit card 106 may then be drawn directly from the cash balance 118 until the cash balance is depleted. As with the other transactions discussed previously, the amount of the purchase is paid directly from the cash balance portion 108 by financial institution 120 to the merchant.

The purchases that entirely use the cash balance 118 may be subject to a transaction fee by the financial institution 120 since there is no government regulation preventing such transaction fees. In one embodiment, the transaction fee may be charged on a per transaction basis such as one dollar for each transaction funded entirely with the cash balance 118. In another embodiment, the transaction fee may be a monthly subscription such as ten dollars for unlimited transactions that entirely use the cash balance 118. In further embodiments, the transaction fee may be a hybrid that charges a per transaction fee up to a set limit. For example, the per transaction fee may be one dollar for each transaction funded entirely with the cash balance 118 up to a limit of five dollars. Once the five dollars are spent, any further transactions do not incur a transaction fee. It will be appreciated that the amount of the charged transaction fees and how the charged transaction fees are structured may take numerous forms that are contemplated by the embodiments disclosed herein In some embodiments, the account holder 104 may load additional loan balance into account 102 after depleting the original loan balance 114 and after making at least one purchase entirely using the cash balance 118. Accordingly, in the illustrated embodiment, the financial institution 120 will determine every time the debit card 106 is used to make a purchase whether the loan balance 114 is greater than zero. If so, then the existing loan balance 114 will be used in any subsequent purchase until the loan balance 114 has been depleted and no transaction fees will be charged as previously discussed.

In an alternative embodiment, it may be desirable to spend the cash balance 118 prior to spending the loan balance 114. In such an embodiment, the account 102 is configured such that when the account holder 104 attempts to make a purchase using the debit card 106, thereby generating a purchase authorization for a given amount, a determination is first made by the financial institution 120 that the loan balance 114 is not to be used in making the purchase. This determination may be based on a prioritization scheme that specifies that the cash balance 118 is to be used before the loan balance 114 when making purchases. Alternatively, the determination may be made upon determining that the loan balance 114 is zero. Regardless, such a determination will result in the cash balance 118 being used before the loan balance 114 when a purchase is made.

If the purchase amount can be entirely funded by the cash balance 118, the purchase is funded in a similar manner as a traditional debit card, and the amount of the purchase is deducted from the cash balance 118 stored in the cash balance portion 108. That is, the amount of the purchase is paid directly by financial institution 120 to the merchant. Since the entire amount of the purchase was funded by the cash balance 118, a transaction fee may be charged by the financial institution 120 in the manner previously described.

On the other hand, if the purchase amount exceeds the cash balance 118 (i.e., the purchase cannot be made without exceeding the cash balance 118), then the funds from the loan balance portion 110 may be used to at least partially fund the transaction. For example, the pre-paid cash balance portion 108 may be used to fund the purchase amount up until the cash balance 118 is reached (i.e., the entire amount of the cash balance 118 is used). Any remaining funds needed may then be drawn from the loan balance 114. As will be appreciated, the determination of which funds or combination of funds (funds in loan balance portion 110 and/or cash balance portion 108) is used fund the purchase transaction is performed at the financial institution 120 and is transparent to the merchant. That is, when the account holder 104 makes the purchase with the debit card 106, the merchant is paid the full purchase price directly by the financial institution 120 in a similar manner as a traditional debit card transaction.

As mentioned, a prioritization scheme may be specified which determines which of the balances 114 or 118 should be used first. In one embodiment, the financial institution 120 may determine the priority sequence. As previously described, the priority sequence will determine when the loan balance is used and thus determine for what transactions the transaction fee may be charged. Accordingly, in some embodiments, the financial institution 120 may determine a prioritization scheme that attempts to maximize the amount of transaction fees that may be charged.

Returning to FIG. 1A, the system 100 may further include an account access 130 that is tied to the account 102. The account access 130 may be a computer with internet access to the account 102, although any other reasonable way to access account 102 is contemplated by the principles of the present invention. In some embodiments, the computer may be a desktop computer, a hand held computer, a cell phone, a PDA, and the like.

In one embodiment, the account holder 104 may use account access 130 to access the account 102, and to set the prioritization scheme. That is, the account holder 104 uses the account access 130 to specify whether the loan balance 114 or the cash balance 118 is used first. As previously described, the priority sequence will determine when the loan balance is used and thus determine for what transactions the transaction fee may be charged.

Because of the complexity of combining both loan balance features and pre-paid features into a single account, various additional transfers may be required to perform any given transaction. FIGS. 2-5 provide additional detail regarding the types of transfers and account management that may occur in order to complete a transaction. FIGS. 2-5 are provided by way of illustration and not limitation. The examples of FIGS. 2-5 merely provide a limited number of examples in which purchase transactions may be handled. Various other techniques for transferring funds between different account balances may be employed in addition to those described below, while maintaining the principle that transactions are first funded from credit if available, and are then funded from cash.

Figure 2:
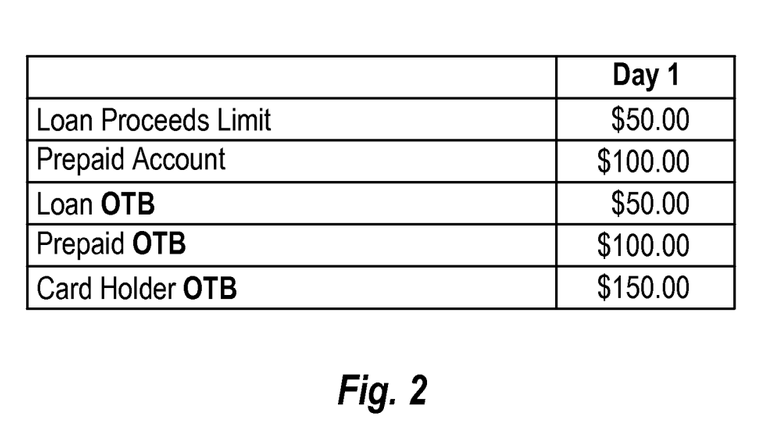
FIG. 2 illustrates an example transaction in accordance with the embodiments disclosed herein.

Referring now to FIG. 2, an example 200 is provided to illustrate the balances that may exist in the various portions 108 and 110 of the account 102. In the present invention, a pre-paid cash balance includes $100.00, and a loan balance 114 of $50.00 is also provided to the account owner 104. Because no purchases have been made to reduce the available loan balance or cash balance, the available loan balance (referred to hereinafter as "Loan OTB") is $50.00, the available cash balance (referred to hereinafter as "Pre-paid OTB") is $100.00, and the total funds that are available to the account owner (referred to hereinafter as "Cardholder OTB") is $150.00.

Figure 3:
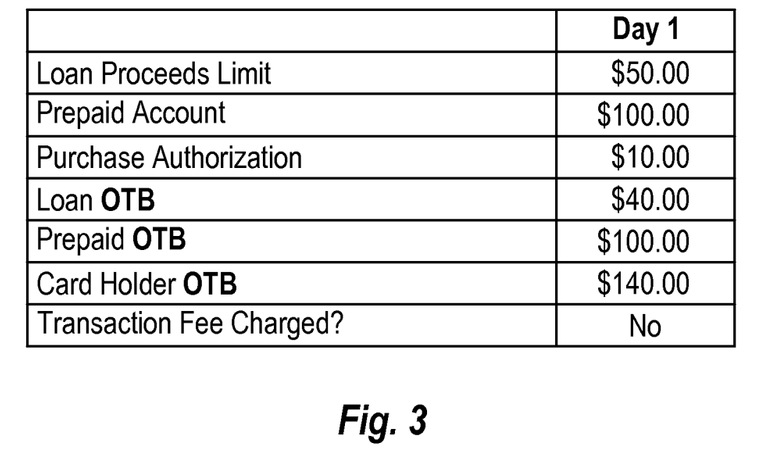
FIG. 3 illustrates an example transaction in accordance with the embodiments disclosed herein.

Referring now to FIG. 3, an example 300 is provided to illustrate the movement of funds between different balances of the account 102 during a purchase transaction where a single purchase takes place. As illustrated, a purchase authorization is made for $10.00. Because the purchase can be funded with the available loan balance, the "Loan OTB" is reduced from the original amount of $50.00 to $40.00, thereby reducing the Cardholder OTB to be reduced to $140.00. Since the purchase was entirely made with the loan balance 114, no transaction fee is charged by the financial institution 120.

Figure 4:
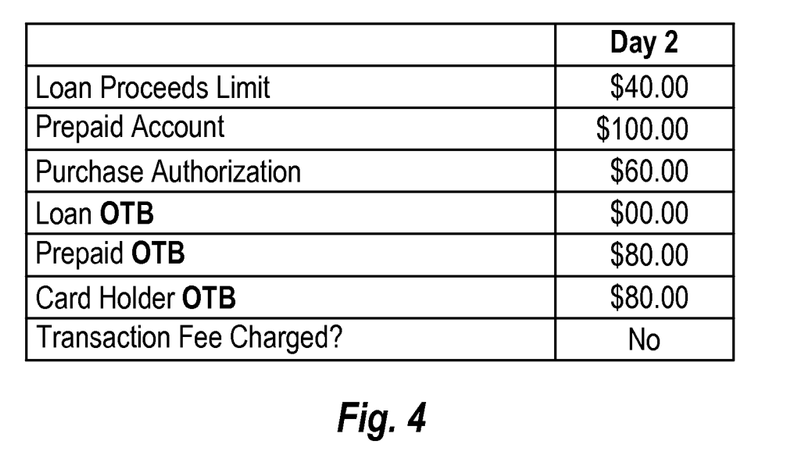
FIG. 4 illustrates an example transaction in accordance with the embodiments disclosed herein.

FIG. 4 depicts the movement of funds between different balances of the account 102 during a purchase transaction where a single purchase takes place subsequent to the purchase made in FIG. 3. As illustrated, a purchase authorization is made for $60.00. Because the purchase cannot be funded with the available loan balance, the "Loan OTB" is reduced from the amount of $40.00 to $0.00. In addition, the "Pre-paid OTB" is reduced from the original amount of $100 to $80 as $20 of this account is needed to complete the $60 purchase. This reduces the Cardholder OTB to $80.00. Since the purchase was made with both the loan balance 114 and the cash balance 118, no transaction fee is charged by the financial institution 120.

Figure 5:
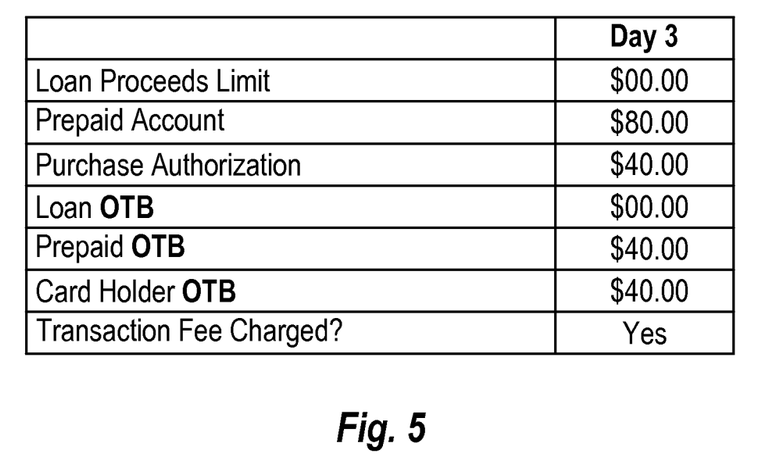
FIG. 5 illustrates an example transaction in accordance with the embodiments disclosed herein.

FIG. 5 depicts the movement of funds between different balances of the account 102 during a purchase transaction where a single purchase takes place subsequent to the purchase made in FIG. 4. As illustrated, a purchase authorization is made for $40.00. Because the account holder 104 has not replenished the loan balance 114, the "Loan OTB" is at zero and the entire $40.00 purchase must be entirely made from the cash balance 118. Accordingly, the "Pre-paid OTB" is reduced from the existing amount of $80.00 to $40.00, thereby reducing the Cardholder OTB to be reduced to $40.00. Since the purchase was entirely made with the cash balance 118, a transaction fee may be charged by the financial institution 120 according to the agreement with the account holder 104.

Figure 1B:
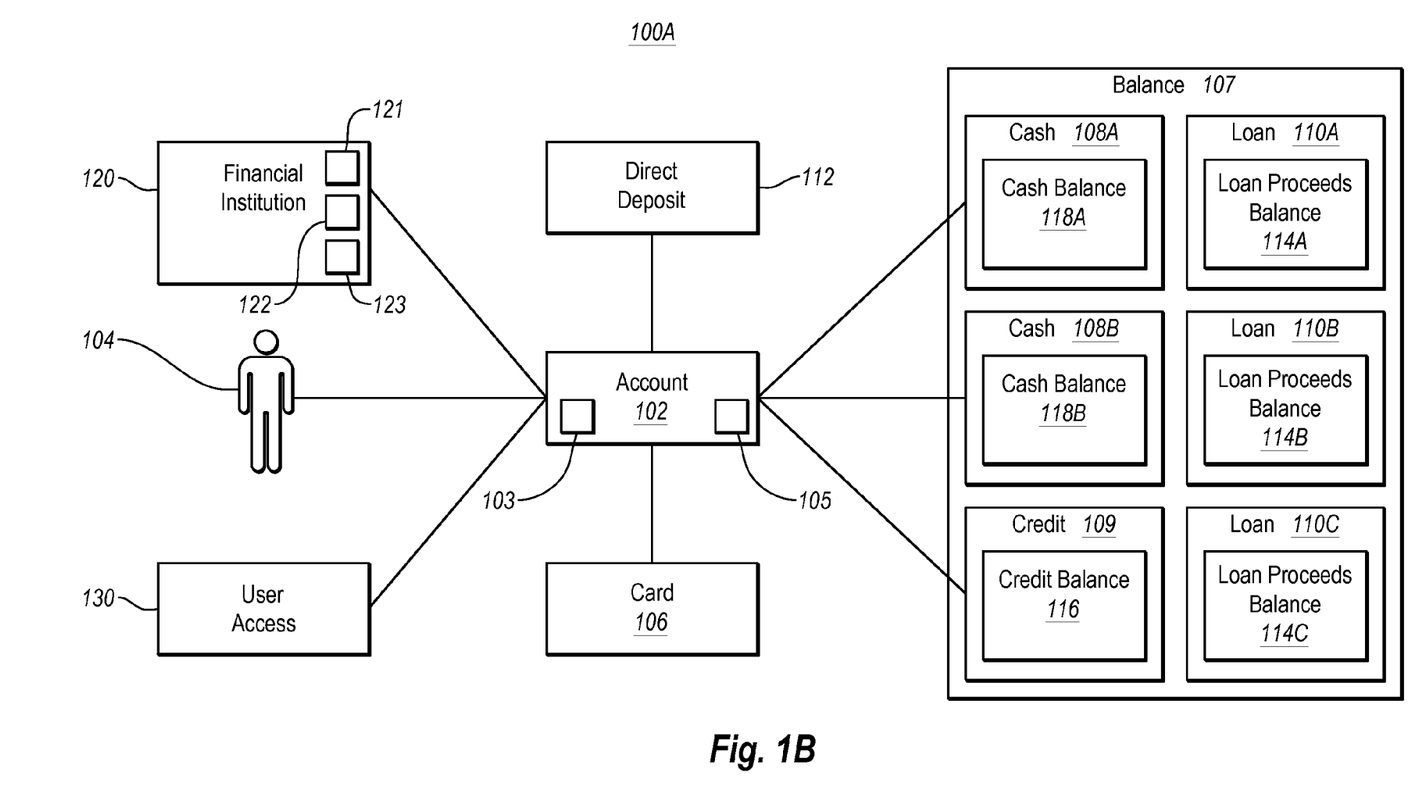
FIG. 1B illustrates an alternative embodiment of the financial system of FIG. 1A.

Attention is now given to FIG. 1B, which illustrates an alternative embodiment of the financial system 100. As illustrated, the embodiment of FIG. 1B includes the balance 107 that is linked to the account 102. However, in this embodiment, the balance 107 may include more than one cash balance portion and more than one loan portion as well as a credit portion. It will be appreciated that the number of cash, credit, and loan portions shown in FIG. 1B are illustrative only and are not meant to limit the embodiments disclosed herein as any number of cash, credit, and loan portions are contemplated by the embodiments disclosed herein. In addition, the balance 107 may include other types of portions that are not cash, credit, or loan balance portions.

For example, the balance 107 may include a cash balance portion 108A that includes a cash balance 118A and a cash balance portion 108B that includes a cash balance 118B. In one embodiment, the cash balance portion 108A may be tied to the direct deposit mechanism 112 so that funds from a paycheck or other type of income may be regularly added to the cash balance 118A. In addition, the cash balance portion 108B may be used by the account holder 104 to directly pay the financial institution 120 an amount of cash to add to account cash balance 119B, writing a check, wiring money to financial institution 120, or by providing access to another bank account. In other words, the cash balance portion 108B may be used to add by any reasonable means funds to the cash balance 118B.

The balance 107 may also include a credit portion 109 that includes a credit balance 116. The credit portion 109 may be any traditional credit account that provides an amount of credit to the account holder 104. The credit balance 116 may reflect the amount of credit that has been extended and the how much credit remains to be spent. The credit account may be provided by the financial institution 120 or by another financial institution.

The balance 107 further includes loan portions 110A, 110B and 110C that each includes loan balances 114A, 114B and 114C respectively. In one embodiment, the loan balance 114A may include the balance from a first loan 121 from the financial institution 120, the loan balance 114B may include the balance from a second loan 122 from the financial institution 120, and the loan balance 114C may include the balance from a third loan 121 from the financial institution 120.

In one embodiment, each of or at least some of the cash balance portions 108A-B, the credit portion 109, and loan portion 110A-C may include its own configurable usage velocity schedule. The configurable usage velocity schedule may dictate how often money may be added to cash 108A-B, credit 109, or loan 110A-C portions and how often money may be spent from cash 108A-B, credit 109, or loan 110A-C portions. For example, the cash balance portion 108A may have a usage velocity schedule that indicates that only $500 may be added to the cash balance 118A and that money may only be removed from the cash balance 118A at a rate of $50 a day. In contrast, cash balance portion 108B may have a usage velocity schedule that indicates that any amount of cash may be added to the cash balance 118B and that any amount of available cash balance 118B may be spent. It will be appreciated that the configurable usage velocity schedules may be configured in any reasonable way. In some embodiments, the configurable usage velocity schedules will conform to and be determined by various financial laws and regulations.

In embodiments that include more than one cash, credit, or loan balance portions, the account 102 may include a prioritization scheme or mechanism 105 that determines which portion of balance 107 to use first when receiving a purchase request. The prioritization scheme 105 may be determined by the financial institution 120 or it may be determined by the account holder 104 using the account access 130 as previously described. In some embodiments, the prioritization scheme 105 may mix the use of the different portions so that all of one type of portion need not be fully used before another type is used.

For example the prioritization scheme 105 may indicate that all of the loan proceed portions 110 be spent before the other portions 108 and 109 are spent. Alternatively, the prioritization scheme 105 may indicate that cash balance portion 108A be spent first, followed by loan portion 110B, and then followed by credit portion 109.

In such an embodiment, the account 102 is configured such that when the account holder 104 attempts to make a purchase using the debit card 106, thereby generating a purchase authorization for a given amount, a determination is first made by the financial institution 120 of which account portion is specified by the prioritization scheme 105 to be used first and the subsequent order of the account portions.

If the purchase amount can be entirely funded by the first portion specified by the prioritization scheme 105, then the amount of the purchase is deducted from that portion and sent to the merchant. If the entire amount cannot be funded by the first portion, then funds may be deducted from the other funds indicated by the prioritization scheme 105 and sent to the merchant.

A determination is then made by the financial institution 120 of whether any of the funds used were deducted from the loan proceed balances 114A-114C. If so, then as previously discussed no transaction fee may be charged to account holder 104. However, if the loan proceed balances 114A-114C were not used, then a transaction fee may be charged as previously discussed.

In one embodiment, each of the cash balance portions 108A and 108B and the credit portion 109 may include a configurable transaction fee schedule that is unique to that cash or credit portion. For example, the cash balance portion 108A may have a transaction fee schedule that indicates that a transaction fee of $1 is charged for any transaction using the cash balance portion 108A. In contrast, the cash balance portion 108B may have a transaction fee schedule that indicates a $10 fee for unlimited transactions while the credit portion 109 may have a transaction fee schedule that indicates that a hybrid transaction fee as previously discussed. As will be appreciated, the configurable transaction fee schedule may be structured in numerous ways. It will be appreciated that prioritization scheme 105 may be structured according to the various configurable transaction fee schedules so that the amount of fees received by financial intuition 120 may be maximized or minimized depending on whether financial institution 120 or the account holder 104 determines the prioritization scheme 105.

Figure 6:
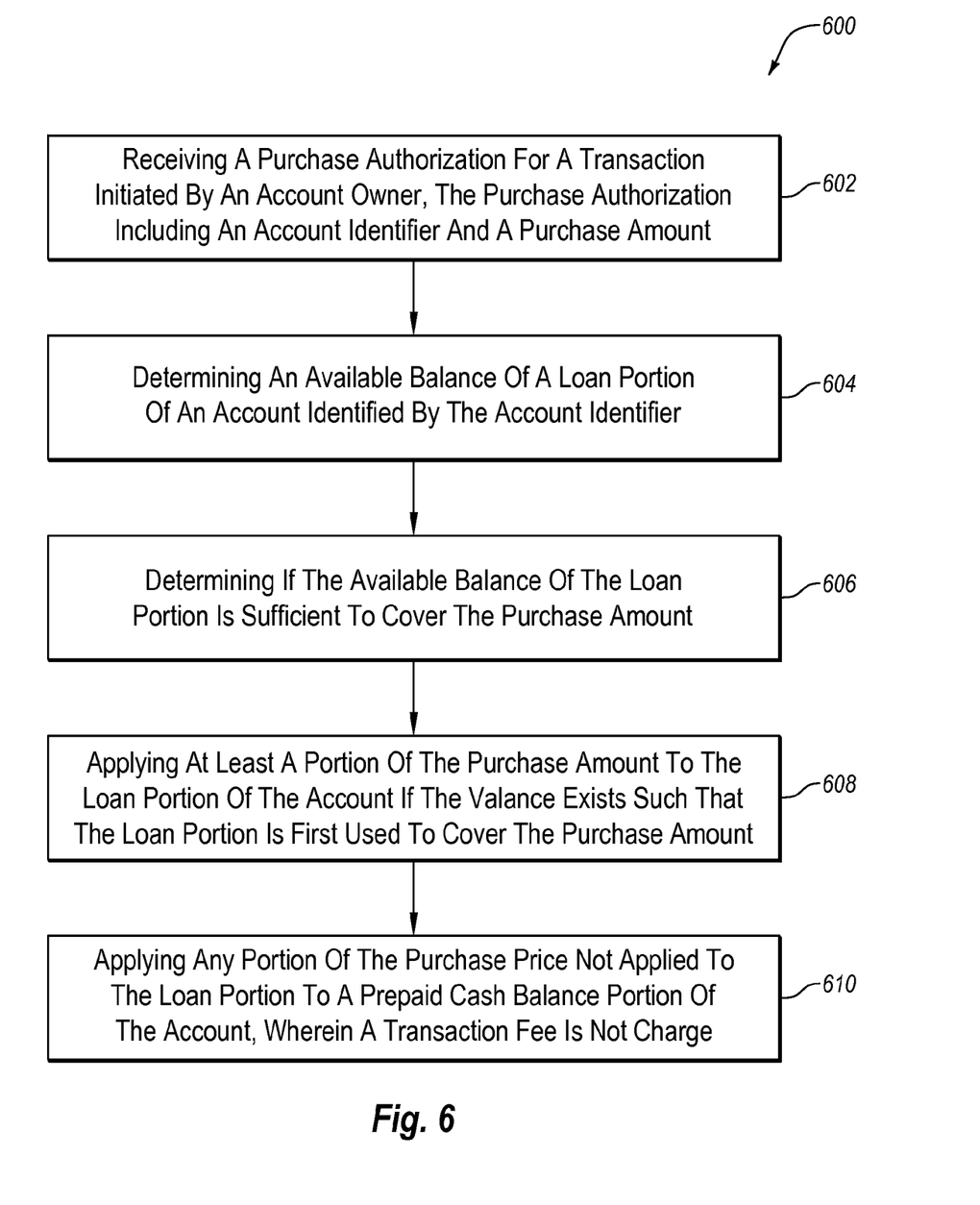
FIG. 6 illustrates a flowchart of a method for a financial institution to process a purchase transaction initiated by an account holder using a financial instrument tied to both a loan balance portion and a pre-paid cash balance portion.

A method 600 for a financial institution to process a purchase transaction initiated by the account holder using a financial instrument will now be described in relation to FIG. 6. The method may be performed in a system that includes the financial instrument such as the debit card 106 or the like that is tied to the financial account, such as account 102. The financial account may include both a loan balance portion and a pre-paid portion that are used in performing the purchase transaction.

The method includes receiving 602 a purchase authorization for a transaction initiated by an account owner. The purchase authorization may include an account identifier and a purchase amount. For example, a purchase authorization such as those illustrated in FIGS. 2-5 may be initiated by the account owner 104. The purchase authorization may further include an account identifier 103 and purchase amount such as those illustrated in FIGS. 2-5 that specify how the purchase amount is allocated between the loan balance portion and the pre-paid cash balance portion.

The method also includes determining 604 an available balance of a loan balance portion of an account identified by the account identifier and determining 606 if the available balance of the loan balance portion is sufficient to cover the purchase amount. For example, the system may determine if the available loan balance 114 exists and if so, is the available loan balance 114 is sufficient to cover the purchase price.

The method further includes applying 608 at least a portion of the purchase amount to the loan balance portion of the account if the available balance exists. This ensures that the loan balance portion is used first. For example, as described in detail above the purchase amount is first applied to the loan balance portion 110 if the loan balance 114 is sufficient as determined in act 606.

The method further includes applying 610 any portion of the purchase price not applied to the loan balance portion to the pre-paid cash balance portion of the account. For example, as described in detail above any portion of the purchase amount not applied to credit portion 110 is obtained from the pre-paid cash balance portion 108. In addition, in such circumstances, the financial institution 120 does not charge a transaction fee because the loan balance 114 was used to at least partially fund the purchase.

Figure 7:
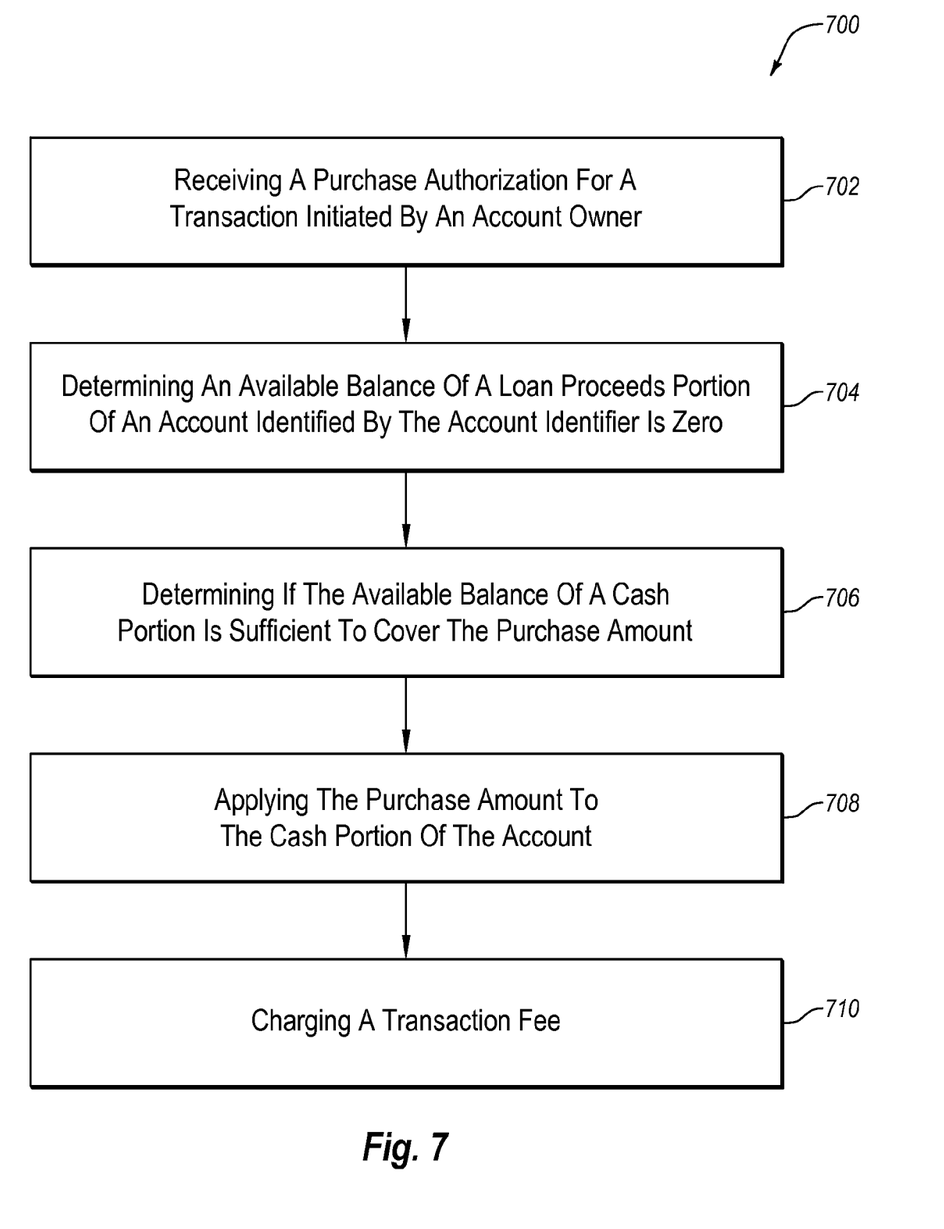
FIG. 7 illustrates a flowchart of an alternative method for a financial institution to process a purchase transaction initiated by an account holder using a financial instrument tied to both a loan balance portion and a pre-paid cash balance portion.

FIG. 7 illustrates a method 700 for establishing the financial account. The method may be performed in a system that includes the financial instrument such as the debit card 106, or the like, that is tied to the financial account, such as account 102. The financial account may include both a loan balance portion and a pre-paid portion that are used in performing the purchase transaction.

The method includes receiving 702 a purchase authorization for a transaction initiated by an account owner. The purchase authorization may include an account identifier and a purchase amount. For example, a purchase authorization such as those illustrated in FIGS. 2-5 may be initiated by the account owner 104. The purchase authorization may further include an account identifier 103 and purchase amount such as those illustrated in FIGS. 2-5 that specify how the purchase amount is allocated between the loan balance portion and the pre-paid cash balance portion.

The method also includes determining 704 an available balance of a loan balance portion of an account identified by the account identifier that is not to be used to cover any portion of the purchase amount. The method further includes determining 706 if the available balance of a cash balance portion is sufficient to cover the purchase amount. For example, this determination may be based on a prioritization scheme that specifies that the cash balance 118 is to be used before the loan balance 114 when making purchases. Alternatively, the determination may be made upon determining that the loan balance 114 is zero. The system may also determine that the available cash balance 118 is sufficient to cover the purchase price.

The method further includes applying 708 the purchase amount to the cash balance portion of the account if the available balance exists. For example, as described in detail above the purchase amount is entirely applied to the cash balance portion 108 if the loan balance 114 does not contain any funds as determined in act 706.

The method further includes charging 710 a transaction fee. For example, as described in detail above, whenever the entire purchase transaction is funded by the pre-paid cash balance portion 108, the financial institution is allowed to charge a transaction fee.

One skilled in the art will appreciate that, for the processes and methods disclosed herein, the functions performed in the processes and methods may be implemented in differing order. And, the order prioritized can be changes so that in a first method the loan balance is applied first then the priority is changed and in a second method practiced after the first method the cash or credit balance is applied first or vice-versa. Furthermore, the outlined steps and operations are only provided as examples, and some of the steps and operations may be optional, combined into fewer steps and operations, or expanded into additional steps and operations without detracting from the essence of the disclosed embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible computer readable medium which can be used to store desired program code means in the form of computer-executable instructions or data structures and which can be accessed by a general purpose or special purpose computer and when executed, the computer-executable instructions cause the general or special purpose computer to perform the methods disclosed herein.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 8:
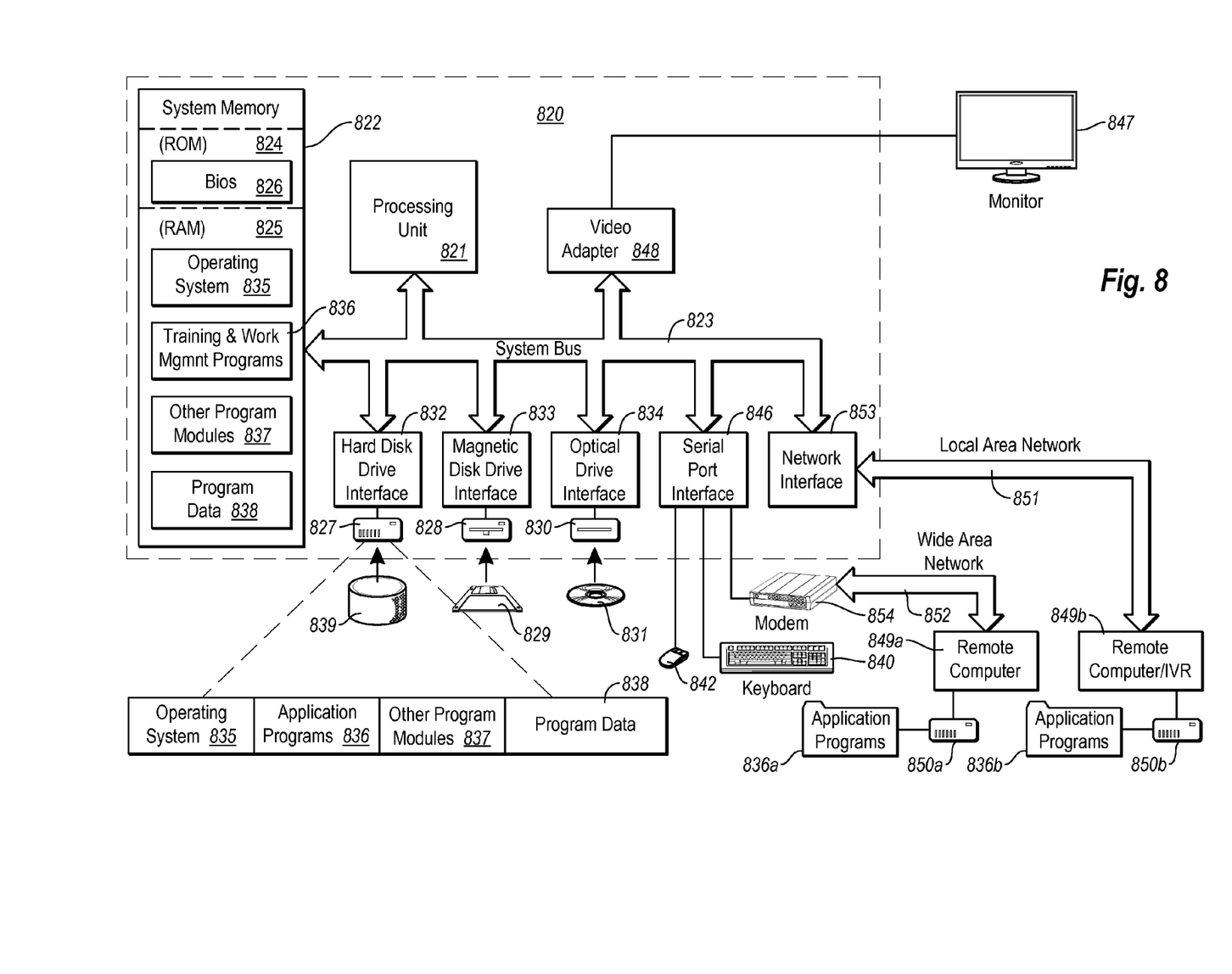
FIG. 8 illustrates an exemplary environment and system for performing the embodiments disclosed herein.

FIG. 8 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, mobile phones, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 8, an example system for implementing the invention includes a general purpose computing device in the form of a conventional computer 820, including a processing unit 821, a system memory 822, and a system bus 823 that couples various system components including the system memory 822 to the processing unit 821. It should be noted however, that as mobile phones become more sophisticated, they are beginning to incorporate many of the components illustrated for conventional computer 820. Accordingly, with relatively minor adjustments, mostly with respect to input/output devices, the description of conventional computer 820 applies equally to mobile phones. The system bus 823 may be any of several types of bus structures including a memory bus or memory controller, a peripheral bus, and a local bus using any of a variety of bus architectures. The system memory includes read only memory (ROM) 824 and random access memory (RAM) 825. A basic input/output system (BIOS) 826, containing the basic routines that help transfer information between elements within the computer 820, such as during start-up, may be stored in ROM 824.

The computer 820 may also include a magnetic hard disk drive 827 for reading from and writing to a magnetic hard disk 839, a magnetic disk drive 828 for reading from or writing to a removable magnetic disk 829, and an optical disc drive 830 for reading from or writing to removable optical disc 831 such as a CD-ROM or other optical media. The magnetic hard disk drive 827, magnetic disk drive 828, and optical disc drive 830 are connected to the system bus 823 by a hard disk drive interface 832, a magnetic disk drive-interface 833, and an optical drive interface 834, respectively. The drives and their associated computer-readable media provide nonvolatile storage of computer-executable instructions, data structures, program modules and other data for the computer 820.

Although the exemplary environment described herein employs a magnetic hard disk 839, a removable magnetic disk 829 and a removable optical disc 831, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 839, magnetic disk 829, optical disc 831, ROM 824 or RAM 825, including an operating system 835, one or more application programs 836, other program modules 837, and program data 838. A user may enter commands and information into the computer 820 through keyboard 840, pointing device 842, or other input devices (not shown), such as a microphone, joy stick, game pad, satellite dish, scanner, or the like. These and other input devices are often connected to the processing unit 821 through a serial port interface 846 coupled to system bus 823. Alternatively, the input devices may be connected by other interfaces, such as a parallel port, a game port or a universal serial bus (USB). A monitor 847 or another display device is also connected to system bus 823 via an interface, such as video adapter 848. In addition to the monitor, personal computers typically include other peripheral output devices (not shown), such as speakers and printers.

The computer 820 may operate in a networked environment using logical connections to one or more remote computers, such as remote computers 849a and 849b. Remote computers 849a and 849b may each be another personal computer, a server, a router, a network PC, a peer device or other common network node, and typically include many or all of the elements described above relative to the computer 820, although only memory storage devices 850a and 850b and their associated application programs 836a and 836b have been illustrated in FIG. 8. The logical connections depicted in FIG. 8 include a local area network (LAN) 851 and a wide area network (WAN) 852 that are presented here by way of example and not limitation. Such networking environments are commonplace in office-wide or enterprise-wide computer networks, intranets and the Internet.

When used in a LAN networking environment, the computer 820 is connected to the local network 851 through a network interface or adapter 853. When used in a WAN networking environment, the computer 820 may include a modem 854, a wireless link, or other means for establishing communications over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing communications over wide area network 852 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method performed in a financial system that includes a financial instrument, the financial instrument being associated with a financial account that includes both a loan balance portion and a pre-paid cash balance portion that are used in performing a purchase transaction, wherein the purchase transaction is initiated by the account holder using the financial instrument, the method comprising:

receiving at a computing system selection of a prioritization scheme that indicates an order of priority of the loan balance portion and the pre-paid cash balance portion of the financial account that are to be used to fund the purchase transaction, the prioritization scheme is selected by a financial institution and configured to maximize an amount of transaction fees charged for the purchase transaction;

receiving at the computing system a purchase authorization for the purchase transaction initiated by the account holder using the financial instrument, the purchase authorization including an account identifier and a purchase amount;

applying at the computing system at least a portion of the purchase amount to the financial account according to the prioritization scheme, the purchase transaction configured so that:
  a transaction fee is not charged by the financial institution when any portion of the loan balance portion is applied to the purchase amount; and
  the transaction fee is charged by the financial institution when no portion of the loan balance portion is applied to the purchase amount;

receiving at the computing system first additional loan balance from a first financial institution;

applying the first additional loan balance to the loan balance portion of the financial account;

receiving at the computing system second additional loan balance from a second financial institution, wherein the second financial institution is not associated with the first financial institution; and applying the second additional loan balance to the loan balance portion of the financial account.

2. A method according to claim 1, further comprising:

determining at the computing system an available balance of a loan balance portion of the financial account identified by the account identifier; and applying at the computing system at least a portion of the purchase amount to the loan balance portion of the financial account if the available balance of the loan balance exists such that the loan balance portion is first used to cover the purchase amount before the pre-paid cash balance according to the prioritization scheme received.

3. A method according to claim 2, further comprising:

applying at the computing system any portion of the purchase amount not applied to the loan balance portion to the pre-paid cash balance portion of the financial account.

4. A method according to claim 1, further comprising:

determining at the computing system an available balance of a pre-paid cash balance portion of the financial account identified by the account identifier; and applying at the computing system at least a portion of the purchase amount to the pre-paid cash balance portion of the financial account if the available balance of the pre-paid cash balance portion exists such that the pre-paid cash balance portion of the financial account is first used to cover the purchase amount before the loan balance according to the prioritization scheme received.

5. A method according to claim 4, further comprising:

applying at the computing system any portion of the purchase amount not applied to the pre-paid cash balance portion to the loan balance portion of the financial account.

6. A method according to claim 1, wherein the first financial institution includes a payday lender where payment for the additional loan balance is due in full at the account holder's next paycheck.

7. A method according to claim 1 wherein the first financial institution includes a pawn shop that offers a secured loan to the account holder, with an item of the account holder's personal property used as collateral.

8. A method according to claim 1, further comprising receiving a direct deposit payment and applying the direct deposit payment to the loan balance portion and/or the pre-paid cash balance portion of the financial account.

9. A method according to claim 8, further comprising first requiring that a direct deposit of a periodic paycheck be set up to obtain the financial account by the account holder.

10. A method according to claim 1, wherein when a transaction fee is charged by the financial institution the transaction fee is charged on a per transaction basis.

11. A method according to claim 1, wherein when a transaction fee is charged by the financial institution the transaction fee is charged on a subscription basis.

12. A method according to claim 1, wherein when a transaction fee is charged by the financial institution the transaction fee is charged on a per transaction basis up to a set limit.

13. A method according to claim 1, wherein the account holder selects the prioritization scheme.

14. A method according to claim 13, wherein the account holder uses an account access including a computer with internet access to access the financial account and set the prioritization scheme.

15. A method according to claim 1, wherein the financial account further includes a credit balance portion.

16. A method according to claim 15, wherein the financial account includes multiple loan balance portions and multiple pre-paid cash balance portions.

17. A method according to claim 16, wherein each loan proceed portion, pre-paid cash balance portion, and the credit balance portion have a configurable usage velocity schedule that dictates how often money may be added to the cash, credit and loan portions and how often money may be spent from the cash, credit and loan portions.

18. A method according to claim 15, wherein the prioritization scheme received indicates that all of the loan balance portion be spent before the pre-paid loan balance portion and credit balance portions are spent.

19. A method according to claim 15, wherein the prioritization scheme received indicates that pre-paid cash balance be spent first, followed by loan balance portion then followed by the credit balance portion.

20. A tangible computer readable medium which stores computer-executable instructions which when executed, the computer-executable instructions cause the one or more processors to perform the method of claim 1.

* * * * *